United States Patent
Shimizu et al.

(10) Patent No.: US 11,327,463 B2
(45) Date of Patent: May 10, 2022

(54) MACHINE TOOL AND CONTROL METHOD OF MACHINE TOOL

(71) Applicant: FANUC CORPORATION, Minamitsuru-gun (JP)

(72) Inventors: Tomoki Shimizu, Yamanashi-ken (JP); Yonpyo Hon, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/893,007

(22) Filed: Jun. 4, 2020

(65) Prior Publication Data

US 2020/0391308 A1 Dec. 17, 2020

(30) Foreign Application Priority Data

Jun. 12, 2019 (JP) .............................. JP2019-109318

(51) Int. Cl.
G05B 19/4093 (2006.01)
G05B 19/404 (2006.01)

(52) U.S. Cl.
CPC ..... G05B 19/40932 (2013.01); G05B 19/404 (2013.01)

(58) Field of Classification Search
CPC ............ G05B 19/40932; G05B 19/404; G05B 2219/50063; G05B 2219/50074; G05B 19/401; G05B 19/19; G05B 2219/35349
USPC ....................................................... 700/193
See application file for complete search history.

(56) References Cited

U.S. PATENT DOCUMENTS

| | | | | |
|---|---|---|---|---|
| 2008/0012519 A1* | 1/2008 | Ozawa | ............... | G05B 19/4061 318/575 |
| 2010/0292822 A1* | 11/2010 | Hahn | ............... | G05B 19/40937 700/98 |
| 2015/0056036 A1* | 2/2015 | Yasukochi | ............... | B23C 5/00 409/131 |
| 2015/0128773 A1* | 5/2015 | Schneider | ............... | B24B 47/14 82/1.11 |
| 2016/0175955 A1* | 6/2016 | Ferry | ................. | B23F 23/1225 700/110 |
| 2019/0163162 A1* | 5/2019 | Morneau | ............... | B23K 26/352 |
| 2019/0377317 A1* | 12/2019 | Wilcox | ................ | G05B 19/404 |

FOREIGN PATENT DOCUMENTS

JP        2005-122332 A        5/2005

\* cited by examiner

*Primary Examiner* — Kenneth M Lo
*Assistant Examiner* — Mohammed Shafayet
(74) *Attorney, Agent, or Firm* — McGinn I.P. Law Group, PLLC.

(57) ABSTRACT

A machine tool for performing a cutting process on a workpiece with a cutting tool, includes: a pre-machining shape acquisition unit configured to acquire the shape of the workpiece before cutting, as a pre-machining shape; a target shape acquisition unit configured to acquire a target shape of the workpiece after cutting; a differential shape acquisition unit configured to acquire a differential shape between the pre-machining shape and the target shape; and a machining path setting unit configured to set machining paths so as to perform the cutting process on the differential shape only.

18 Claims, 10 Drawing Sheets

MACHINE TOOL AND CONTROL METHOD OF MACHINE TOOL

CROSS-REFERENCE TO RELATED APPLICATION

This application is based upon and claims the benefit of priority from Japanese Patent Application No. 2019-109318 filed on Jun. 12, 2019, the contents of which are incorporated herein by reference.

BACKGROUND OF THE INVENTION

Field of the Invention

The present invention relates to a machine tool for performing a cutting process (machining) on a workpiece with a cutting tool as well as relating to a control method of the machine tool.

Description of the Related Art

Conventionally, there have been processing machines that calculate the amount of contour error between the pre-machining shape of a workpiece and the target shape of the workpiece and continue machining the workpiece until the calculated amount of contour error falls within the permissible range (Japanese Laid-Open Patent Publication No. 2005-122332).

SUMMARY OF THE INVENTION

When the cutting amount (depth of cut) of a cutting tool into a workpiece is set small in order to reduce the wear of the cutting tool, there occurs a problem that the machining time becomes longer.

The present invention has been devised in order to solve the above problem, and it is therefore an object of the present invention to provide a machine tool and a control method of a machine tool that can reduce the machining time.

According to the first aspect of the present invention, a machine tool for performing a cutting process on a workpiece with a cutting tool, includes: a pre-machining shape acquisition unit configured to acquire the shape of the workpiece before cutting, as a pre-machining shape; a target shape acquisition unit configured to acquire a target shape of the workpiece after cutting; a differential shape acquisition unit configured to acquire a differential shape between the pre-machining shape and the target shape; and a machining path setting unit configured to set machining paths so as to perform the cutting process on only the differential shape.

According to the second aspect of the present invention, a control method of a machine tool for performing a cutting process on a workpiece with a cutting tool, includes: a pre-machining shape acquisition step of acquiring the shape of the workpiece before cutting, as a pre-machining shape; a target shape acquisition step of acquiring a target shape of the workpiece after cutting; a differential shape acquisition step of acquiring a differential shape between the pre-machining shape and the target shape; and a machining path setting step of setting machining paths so as to perform the cutting process on only the differential shape.

According to the present invention, it is possible to reduce the machining time.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

First Embodiment

[Machine Tool Configuration]

Figure 1:
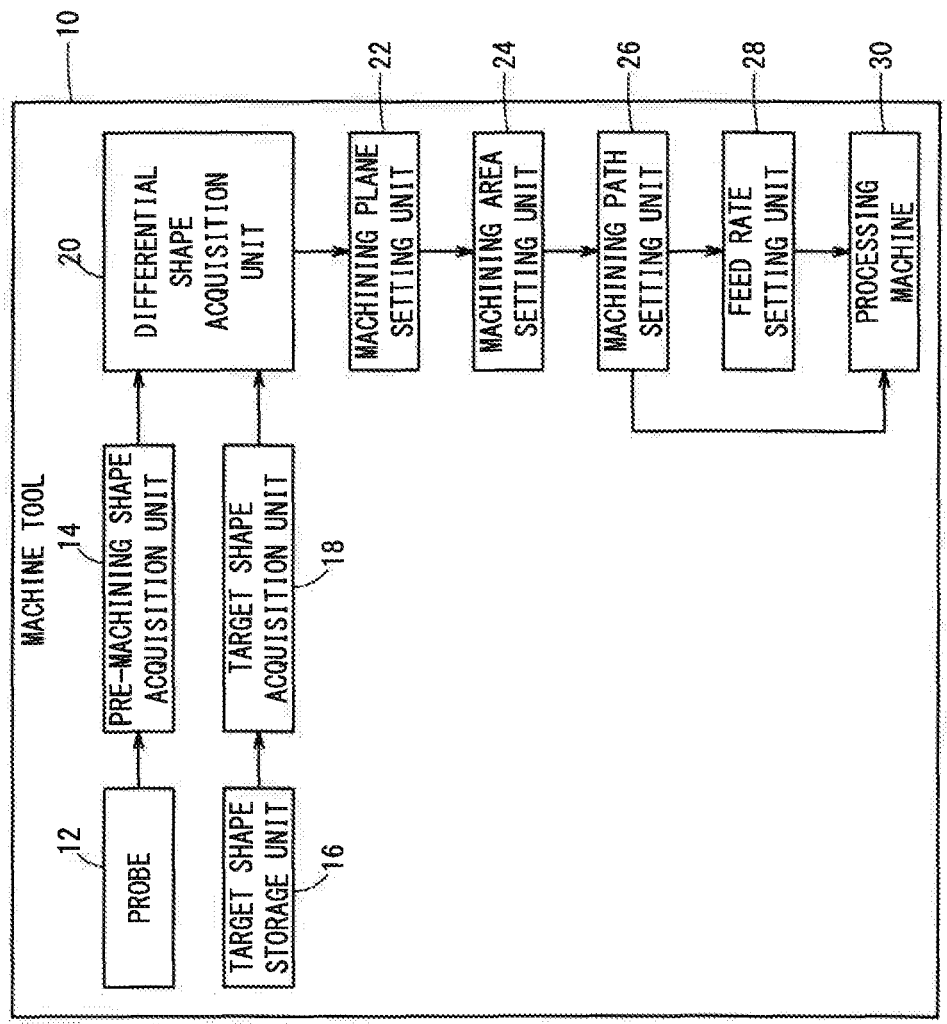
FIG. 1 is a block diagram showing a machine tool.

FIG. 1 is a block diagram showing a machine tool 10 according to the present embodiment. The machine tool 10 includes a probe 12, a pre-machining shape acquisition unit 14, a target shape storage unit 16, a target shape acquisition unit 18, a differential shape acquisition unit 20, a machining plane setting unit 22, a machining area setting unit 24, a machining path setting unit 26, a feed rate setting unit 28 and a processing machine 30.

Figure 2:
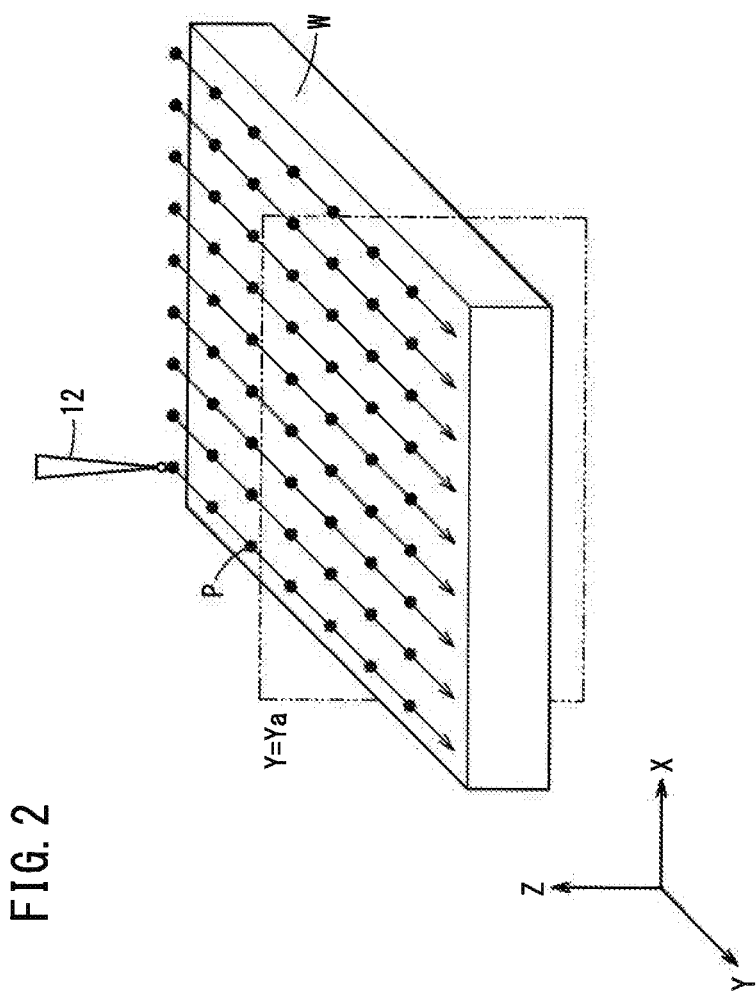
FIG. 2 is a schematic diagram showing a state where a probe is scanning the upper surface of a workpiece before machining.

The probe 12 scans the upper surface of a workpiece W before cutting (machining) to measure the height of the workpiece W. FIG. 2 is a schematic diagram showing a state where the probe 12 is scanning the upper surface of the workpiece W before cutting. The probe 12 measures the height (Z-coordinate) of the upper surface of the workpiece W at each measurement point P while moving along the upper surface of the workpiece W. The measurement points P are located on the upper surface of the workpiece W at intervals of a predetermined distance (step) along the Y-axis and also at intervals of a predetermined distance (pitch) along the X-axis. The step size and the pitch size are specified as appropriate in accordance with accuracy demanded for a pre-machining shape Sa of the workpiece W, which will be acquired by the pre-machining shape acquisition unit 14 later. Here, the probe 12 is a measuring device that measures the height of the upper surface of the workpiece W by contacting the upper surface thereof. However, a measuring device that measures the height of the upper surface of the workpiece W in a non-contact manner may be used instead of the probe 12.

Figure 3:
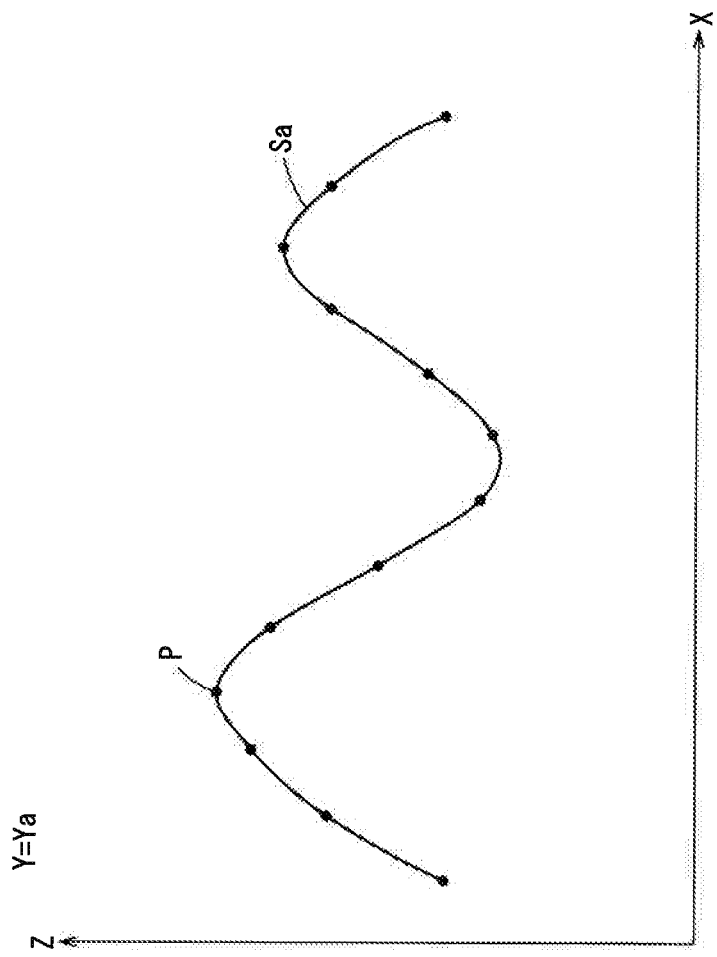
FIG. 3 is diagram showing the positions of multiple measurement points.

The pre-machining shape acquisition unit 14, based on the height information on the upper surface of the workpiece W measured by the probe 12, models the shape (contour) of the upper surface of the workpiece W before cutting and obtains the modeled shape as a pre-machining shape Sa. FIG. 3 is a diagram showing the positions of multiple measurement points P. In FIG. 3, the positions of multiple points P on a plane defined by Y=Ya in FIG. 2 are shown. The pre-machining shape acquisition unit 14 connects the multiple points P to create a model of the shape of the upper surface of the workpiece W, and acquires the created model as the pre-machining shape Sa.

Figure 4:
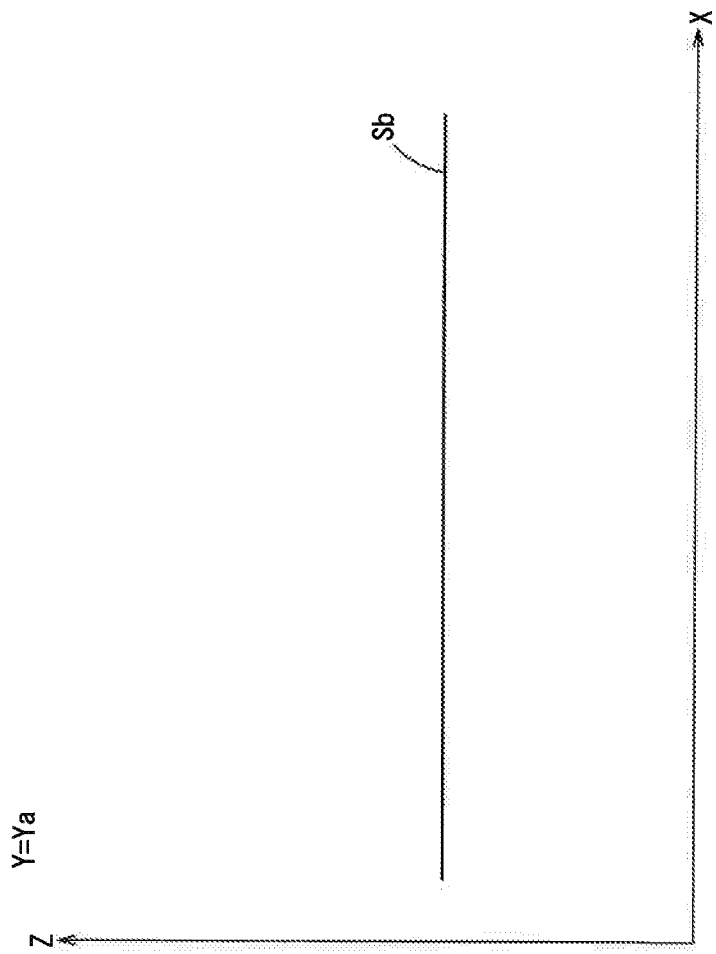
FIG. 4 is a diagram showing a target shape of a workpiece.

The target shape storage unit 16 reads the coordinates of a target shape Sb of the workpiece W after cutting from a CAD or NC program, and stores therein the data. The target shape acquisition unit 18 acquires the target shape Sb of the workpiece W after cutting from the target shape storage unit 16. FIG. 4 is a diagram showing the target shape Sb of the workpiece W. FIG. 4 shows the target shape Sb of the upper surface of the workpiece W on the plane defined by Y=Ya. For simplicity, in the present embodiment, the target shape Sb of the upper surface of the workpiece W is assumed to be a plane parallel to the X-axis, but the target shape Sb of the upper surface of the workpiece W may be a curved surface.

Figure 5:
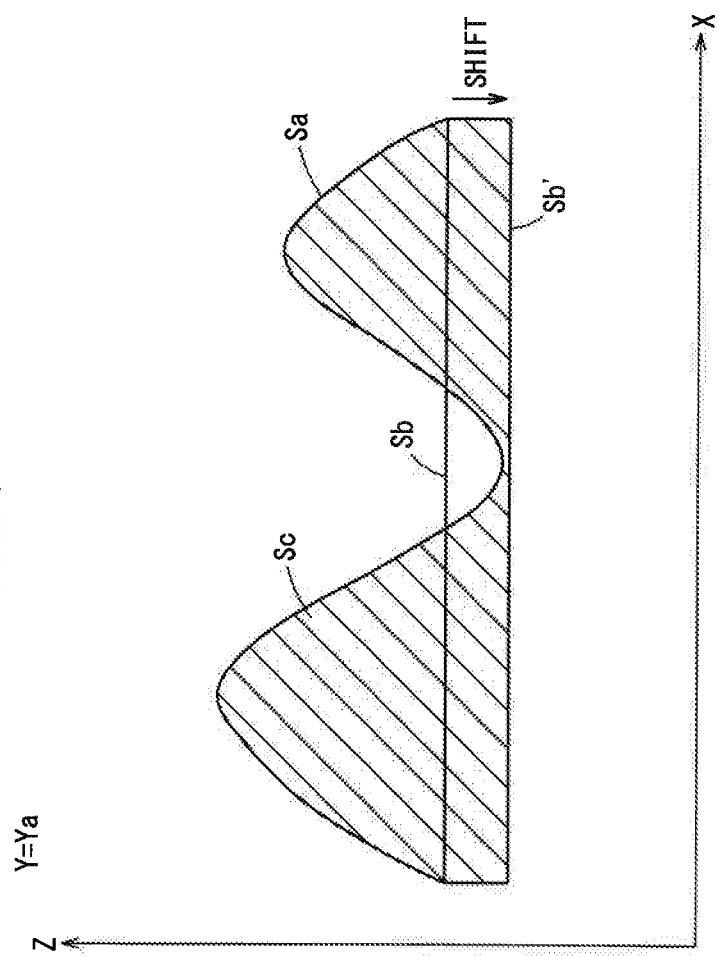
FIG. 5 is a diagram showing a pre-machining shape and a target shape of the upper surface of a workpiece.

The differential shape acquisition unit 20 acquires a differential shape Sc from the pre-machining shape Sa and the target shape Sb of the workpiece W. FIG. 5 is a diagram showing a pre-machining shape Sa and a target shape Sb of the upper surface of the workpiece W. FIG. 5 shows the pre-machining shape Sa and the target shape Sb of the upper surface of the workpiece W on the plane defined by Y=Ya. As shown in FIG. 5, there are portions where the pre-machining shape Sa and the target shape Sb of the upper surface of the workpiece W intersect each other. The differential shape acquisition unit 20 shifts (moves) the target shape of the upper surface of the workpiece W from Sb to Sb' in the Z-axis direction so that the target shape does not intersect the pre-machining shape Sa (i.e., the profile lines do not intersect each other). The differential shape acquisition unit 20 acquires the difference (the hatched part in FIG. 5) between the pre-machining shape Sa of the upper surface of the workpiece W and the shifted target shape Sb', as a differential shape Sc.

Figure 6:
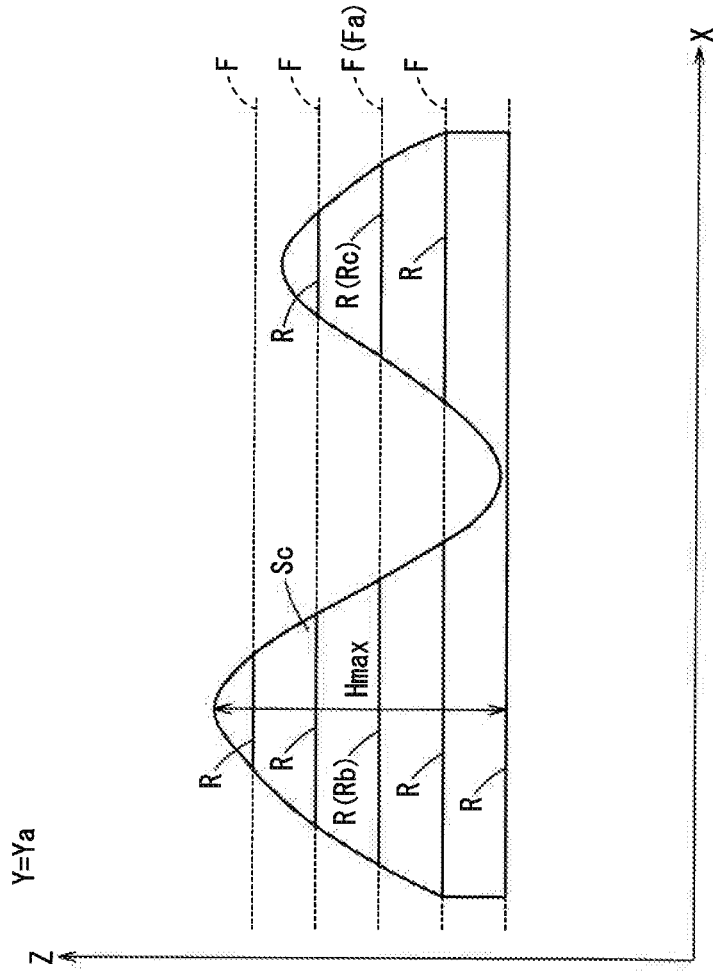
FIG. 6 is a diagram showing a differential shape.

The machining plane setting unit 22, based on the differential shape Sc, sets one or more machining planes F that are parallel to the target shape Sb' of the workpiece W. FIG. 6 is a diagram showing the differential shape Sc. FIG. 6 shows the differential shape Sc on the plane defined by Y=Ya. Hmax is the maximum height of the differential shape Sc. The machining plane setting unit 22 defines multiple machining planes F with respect to the differential shape Sc, one plane for each cutting amount (cutting depth) ΔC of the cutting tool, from the Z-axis negative side to the Z-axis positive side. The number of the machining planes F is a number obtained by adding 1 to a quotient produced by dividing the maximum height Hmax of the differential shape Sc by the cutting amount ΔC of the cutting tool.

Figure 7:
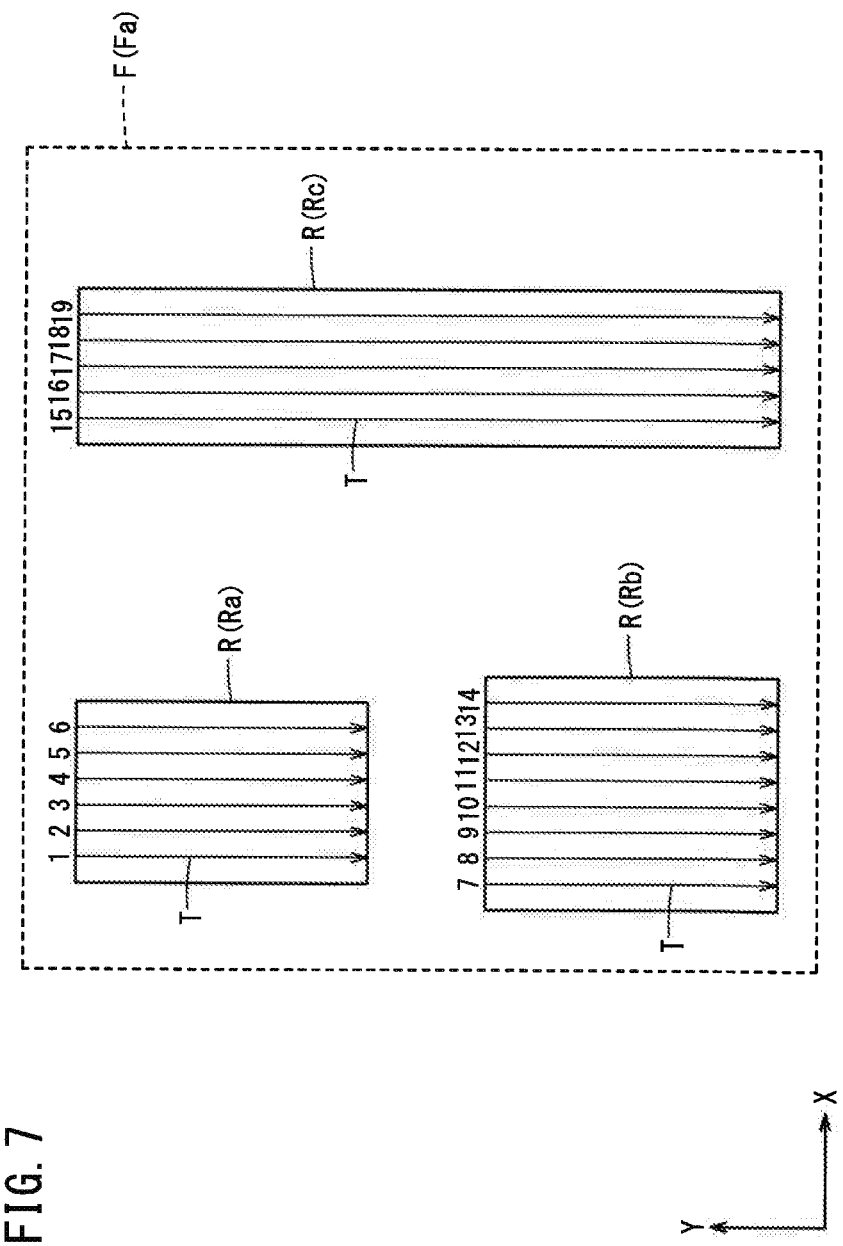
FIG. 7 is a diagram showing a machining plane.

The machining area setting unit 24 defines, as machining areas R, portions where the machining planes F intersect the differential shape Sc. FIG. 7 is a diagram showing a machining plane F. FIG. 7 shows the machining plane Fa in FIG. 6. As shown in FIG. 7, there are defined machining areas Ra, Rb and Rc on the machining plane Fa.

The machining path setting unit 26 sets machining paths T on which the cutting tool moves while cutting (machining) the workpiece W, on each machining area R. As shown in FIG. 7, the machining path setting unit 26 sets machining paths T only in the machining areas Ra to Rc on the machining plane Fa. In other words, the machining path setting unit 26 does not set any machining paths T in arears other than the machining areas Ra to Rc, on the machining plane Fa. The number suffixed to each of the arrows indicating respective machining paths T in FIG. 7 indicates the number of feeding of the cutting tool. When there are multiple machining areas Ra to Rc on one machining plane Fa as shown in FIG. 7, the machining path setting unit 26 sets machining paths T so as to complete a machining process on one machining area R (e.g., machining area Ra) first, and thereafter start another cutting process on a next machining area R (e.g., machining area Rb). That is, the machining path setting unit 26 sets the machining paths T so as to perform machining on one machining area R by a single feed operation of the cutting tool.

The feed rate setting unit 28 sets a feed rate for the cutting tool to be moved on the machining paths T, to the cutting feed rate. Further, the feed rate setting unit 28 sets a feed rate for the cutting tool to be moved from one machining path T to another (i.e., between the machining paths T) before start of each feed operation of the cutting tool, to the rapid traverse rate.

The processing machine 30 includes a cutting tool for cutting the workpiece W and a table for performing relative motion between the workpiece W and the cutting tool. The processing machine 30 performs a cutting process (machining process) on the workpiece W, based on the instructions for performing machining (cutting process) with a machining accuracy of 100 nm or less. The processing machine 30 performs milling or planing.

The functions of the pre-machining shape acquisition unit 14, the target shape acquisition unit 18, the differential shape acquisition unit 20, the machining plane setting unit 22, the machining area setting unit 24, the machining path setting unit 26, and the feed rate setting unit 28 are realized by the processor running a program stored in an unillustrated storage medium. The target shape storage unit 16 is implemented by a storage medium.

[Machining Path Setting Process]

Figure 8:
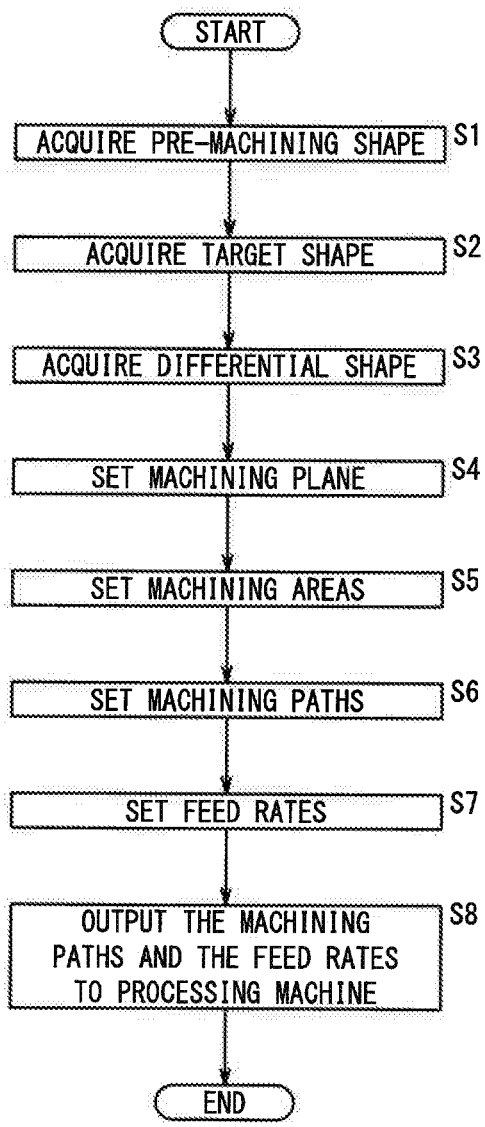
FIG. 8 is a flowchart showing a flow of a machining path setting process.

FIG. 8 is a flowchart showing a flow of a machining path setting process performed in the machine tool 10. The machining path setting process is executed before cutting the workpiece W.

At step S1, the pre-machining shape acquisition unit 14 acquires the pre-machining shape Sa of the workpiece W, and the process goes to step S2.

At step S2, the target shape acquisition unit 18 acquires the target shape Sb of the workpiece W, and the process proceeds to step S3.

At step S3, the differential shape acquisition unit 20 acquires the differential shape Sc, and the process goes to step S4.

At step S4, the machining plane setting unit 22 defines a machining plane F, and the process goes to step S5.

At step S5, the machining area setting unit 24 defines machining areas R, and the process goes to step S6.

At step S6, the machining path setting unit 26 sets machining paths T on each of the machining areas R, and the process goes to step S7.

At step S7, the feed rate setting unit 28 sets a feed rate for the cutting tool to move on the machining path T and the feed rate for the cutting tool to move from one machining path T to another, and the process goes to step S8.

At step S8, the machining path setting unit 26 outputs the machining paths T on each machining area R to the processing machine 30, and the feed rate setting unit 28 outputs the feed rates of the cutting tool to the processing machine 30. Thus, the machining path setting process is put to an end.

[Operation and Effect]

The greater the cutting amount (cutting depth) of the cutting tool, the shorter the machining time, but the wear of the cutting tool is accelerated so that the usable life of the cutting tool becomes shorter. On the other hand, when the cutting amount of the cutting tool is set smaller, the wear of the cutting tool is suppressed, and the usable life of the cutting tool can be extended, but the machining time becomes longer. In particular, the processing machine 30 of the machine tool 10 of this embodiment is an ultra-high-precision processing machine that machines the workpiece W based on instructions for performing machining with the machining accuracy of 100 nm or less, and hence the cutting amount of the cutting tool cannot be set large, so the machining time becomes longer. Therefore, it is demanded to shorten the machining time while keeping the cutting amount of the cutting tool small.

The machining paths T are set on the machining planes F which are parallel with the target shape Sb of the workpiece W. However, the pre-machining shape Sa of the workpiece W is not parallel to the target shape Sb. Therefore, even if the cutting tool is moved in parallel to try to machine the entire surface of the machining plane F, in reality there exist many portions where the cutting tool does not come into contact with the workpiece W. This situation occurs more often as the cutting amount (depth of cut) of the cutting tool is smaller. Even when the cutting tool is not cutting the workpiece W, the cutting tool is kept moving at the cutting feed rate, resulting in a longer machining time.

To deal with this, the machine tool 10 of the present embodiment is configured to set machining paths T so as to perform machining on only the differential shapes Sc between the pre-machining shape Sa of the workpiece W before machining and the target shape Sb of the workpiece W after machining. This makes it possible to avoid the situation in which the cutting tool is idly moved at the cutting feed rate without cutting the workpiece W, which leads to reduction in machining time.

Further, the machine tool 10 of the present embodiment is configured to define the portions where each machining plane F intersects the differential shape Sc, as machining areas R, and set machining paths T in the machining areas R only, on each of the machining planes F. With this configuration, it is possible to avoid a situation that the cutting tool is idly moved at the cutting feed rate along the machining path T without cutting the workpiece W, which leads to reduction in machining time.

Moreover, the machine tool 10 of the present embodiment is configured to set machining paths T so as to complete machining (the cutting process) on one machining area (first machining area) R first and thereafter start machining on a next machining area (second machining area) R when there are two machining areas R on the same machining plane F. With this configuration, it is possible to avoid a situation that the cutting tool is idly moved at the cutting feed rate along the machining path T without machining the workpiece W, which leads to reduction in machining time.

Second Embodiment

A machine tool 10 according to the second embodiment is partially different from the machine tool 10 of the first embodiment in the processes performed in the machining path setting unit 26 and the feed rate setting unit 28.

Figure 9:
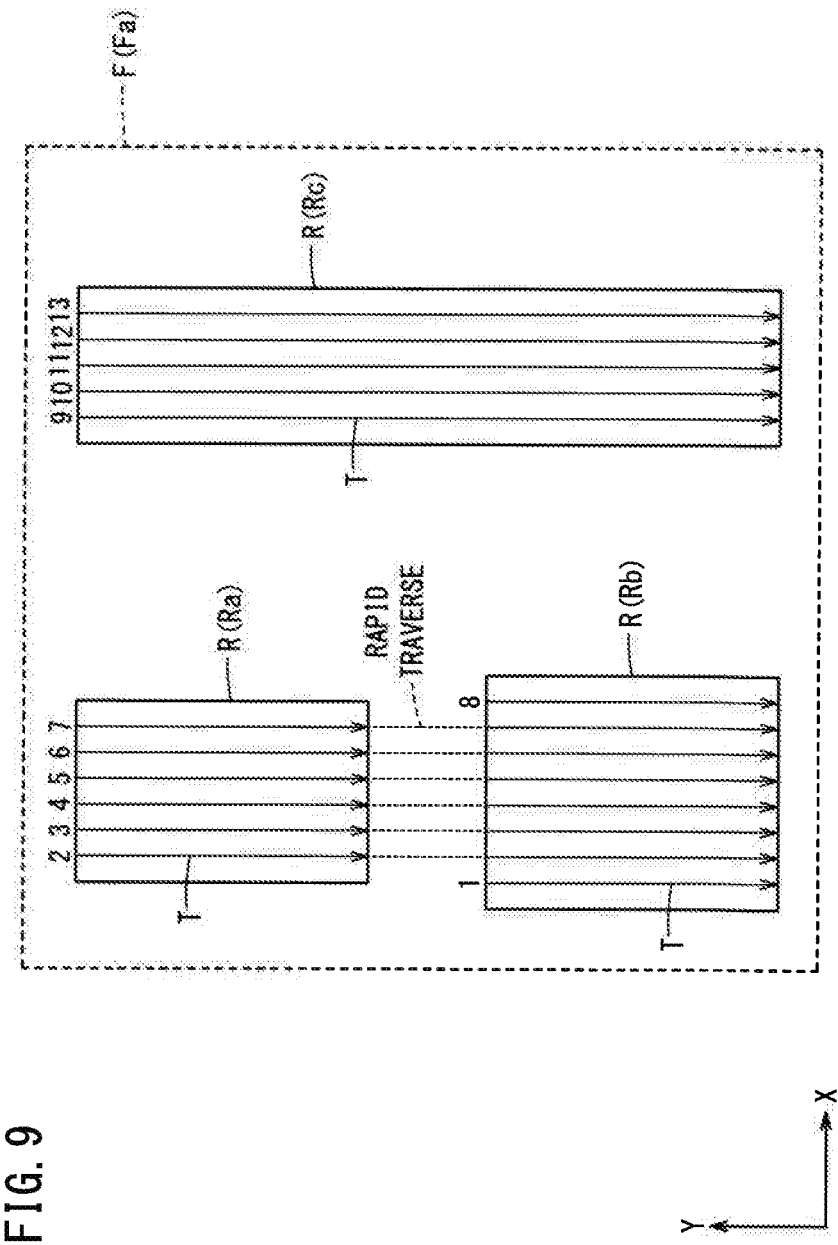
FIG. 9 is a diagram showing a machining plane.

FIG. 9 is a diagram showing a machining plane F. FIG. 9 shows the machining plane Fa in FIG. 6. As shown in FIG. 9, machining areas Ra, Rb and Rc are set on the machining plane Fa.

The machining path setting unit 26 defines, on machining areas R, machining paths T on which the cutting tool is moved while cutting the workpiece W. As shown in FIG. 9, machining paths T are defined only in the machining areas Ra to Rc, on the machining plane Fa. The number suffixed to the arrow for each machining path T in FIG. 9 is the number of feeding the cutting tool. As shown in FIG. 9, when, on the same machining plane Fa, the machining areas Ra and Rb reside side by side along the feed direction of the cutting tool, the machining path setting unit 26 sets machining paths T so that the cutting tool can cut the machining areas Ra and Rb in a single feed operation (single feed stroke).

The feed rate setting unit 28 sets a feed rate for the cutting tool to move on machining paths T, to the cutting feed rate. Further, the feed rate setting unit 28 sets a feed rate for the cutting tool to move from one machining path T to another before start of each feed stroke of the cutting tool, to the rapid traverse rate. Further, the feed rate setting unit 28 sets a feed rate for the cutting tool to move from one machining path T to another in the course of a single feed stroke of the cutting tool, as shown in FIG. 9, to the rapid traverse rate.

[Operation and Effect]

In the machine tool 10 of this embodiment, the machining paths T are defined so that, when there are two machining areas R residing side by side along the feed direction of the cutting tool on the same machining plane F, one machining area R and another machining area R can be cut by a single feed stroke of the cutting tool. As a result, it is possible to reduce the number of feed strokes of the cutting tool, and hence the machining time can be reduced.

In the machine tool 10 of this embodiment, when one machining area (first machining area) R and another machining area (second machining area) R are cut by a single feed stroke of the cutting tool, the feed rate of the cutting tool to be moved between the machining path T on the one machining area R and the machining path T on the other machining area R is set to the rapid traverse rate. This makes it possible to reduce the machining time.

Third Embodiment

A machine tool 10 according to the third embodiment is partially different from the machine tools 10 of the first and second embodiments in the process performed in the differential shape acquisition unit 20.

Figure 10:
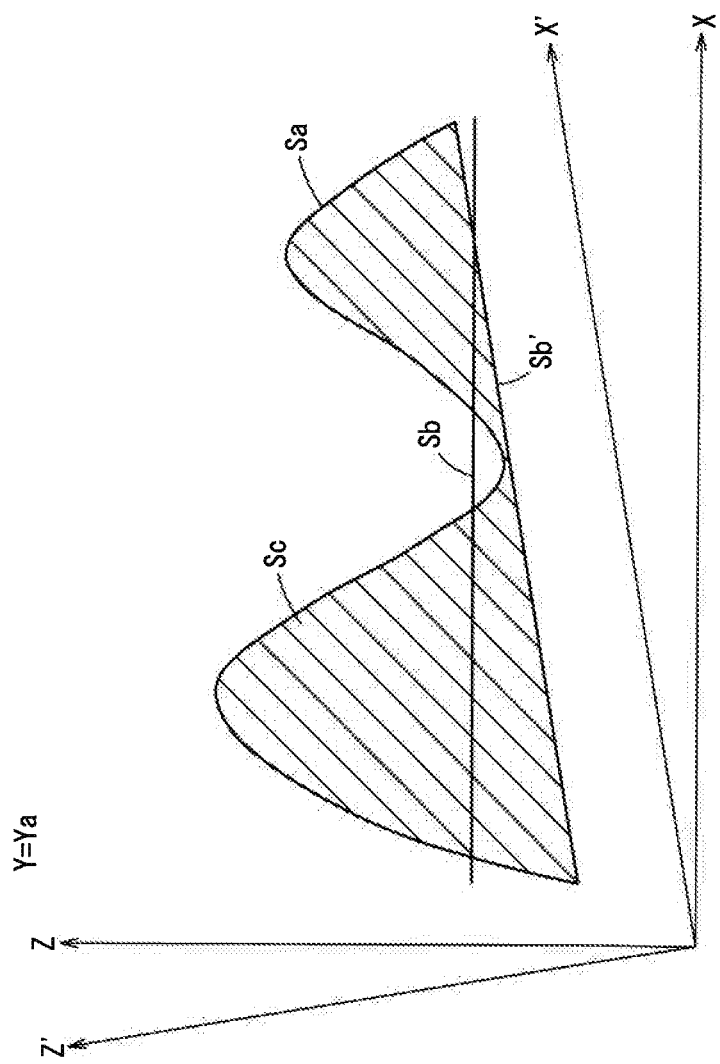
FIG. 10 is a diagram showing a pre-machining shape and a target shape of the upper surface of a workpiece.

The differential shape acquisition unit 20 acquires a differential shape Sc from the pre-machining shape Sa and the target shape Sb of the workpiece W. FIG. 10 is a diagram showing a pre-machining shape Sa and a target shape Sb of the upper surface of the workpiece W. FIG. 10 shows the pre-machining shape Sa and the target shape Sb of the upper surface of the workpiece W on the surface defined by Y=Ya. As shown in FIG. 10, there are portions where the pre-machining shape Sa intersects the target shape Sb of the upper surface of the workpiece W. The differential shape acquisition unit 20 shifts (moves) the target shape of the upper surface of the workpiece W from Sb to Sb' so that the target shape does not intersect the pre-machining shape Sa. In the differential shape acquisition units 20 in the first and second embodiments, the target shape Sb is shifted in the Z-axis direction only. In this embodiment, the differential shape acquisition unit 20 shifts (moves) the target shape Sb so that the volume of the differential shape Sc becomes minimum. The differential shape acquisition unit 20 sets up a new coordinate system X'Y'Z' in accordance with the movement of the target shape Sb. The following processes are implemented on the basis of the new coordinate system X'Y'Z'.

[Operation and Effect]

The machine tool 10 of this embodiment moves the target shape Sb relative to the pre-machining shape Sa so that the volume of the differential shape Sc becomes minimum. As a result, the volume of material to be removed from the pre-machining shape Sa by machining is minimized so that the machining time can be reduced.

Other Embodiments

The above first through third embodiments have been described on the assumption that the upper surface of the workpiece W is machined, but the present invention can be applied similarly to the cutting of side surfaces of the workpiece W.

The processing machines 30 of the machine tools 10 of the first through third embodiments are an ultra-high-precision processing machine that performs machining on a workpiece W according to instructions for performing machining with the machining accuracy of 100 nm or less. However, the processes described in the first to third embodiments may be applied similarly to the machine tool that performs machining on a workpiece W according to instructions for performing machining with the machining accuracy of greater than 100 nm.

Technical Ideas Obtained from the Embodiments

Ideas that can be grasped from the above embodiments will be described below.

The machine tool (10) for performing a cutting process on a workpiece with a cutting tool includes: a pre-machining shape acquisition unit (14) configured to acquire the shape of the workpiece before cutting, as a pre-machining shape; a target shape acquisition unit (18) configured to acquire a target shape of the workpiece after cutting; a differential shape acquisition unit (20) configured to acquire a differential shape between the pre-machining shape and the target shape; and a machining path setting unit (26) configured to set machining paths so as to perform the cutting process on only the differential shape. This configuration makes it possible to reduce the machining time.

The above machine tool may further include: a machining plane setting unit (22) configured to set one or more machining planes parallel to the target shape; and a machining area setting unit (24) configured to define a portion where each machining plane intersects the differential shape, as a machining area, and the machining path setting unit may be configured to set the machining paths in only the machining area on each of the machining planes. This configuration makes it possible to reduce the machining time.

In the above machine tool, when there are first and second machining areas on an identical machining plane, the machining path setting unit may set the machining paths so as to complete the cutting process on the first machining area first and thereafter start the cutting process on the second machining area. This configuration makes it possible to reduce the machining time.

In the above machine tool, when there are first and second machining areas residing side by side along the feed direction of the cutting tool on an identical machining plane, the machining path setting unit may set the machining paths so as to perform the cutting process on the first machining area and the second machining area by a single feed stroke of the cutting tool. This configuration makes it possible to reduce the machining time.

The above machine tool may further include a feed rate setting unit (28) configured to, when the cutting process is performed on the first machining area and the second machining area by a single stroke of the cutting tool, set the feed rate of the cutting tool to be moved between the machining path of the first machining area and the machining path of the second machining area, to a rapid traverse rate. This configuration makes it possible to reduce the machining time.

In the above machine tool, the differential shape acquisition unit may be configured to shift the target shape relative to the pre-machining shape so as to minimize the volume of the differential shape. This configuration makes it possible to reduce the machining time.

The above machine tool may further includes a processing machine (30) configured to perform the cutting process on the workpiece based on instructions for performing machining (the cutting process) with a machining accuracy of 100 nm or less. This configuration makes it possible to reduce the machining time.

A control method of a machine tool (10) for performing a cutting process on a workpiece with a cutting tool includes: a pre-machining shape acquisition step of acquiring the shape of the workpiece before cutting, as a pre-machining shape; a target shape acquisition step of acquiring a target shape of the workpiece after cutting; a differential shape acquisition step of acquiring a differential shape between the pre-machining shape and the target shape; and a machining path setting step of setting machining paths so as to perform the cutting process on only the differential shape. This configuration makes it possible to reduce the machining time.

The above control method of the machine tool may further include: a machining plane setting step of setting one or more machining planes parallel to the target shape; and a machining area setting step of defining a portion where each machining plane intersects the differential shape, as a machining area, wherein the machining path setting step sets the machining paths in only the machining area on each of the machining planes. This configuration makes it possible to reduce the machining time.

In the above control method of the machine tool, the machining path setting step, when there are first and second machining areas on an identical machining plane, may set the machining paths so as to complete the cutting process on the first machining area first and thereafter start the cutting process on the second machining area. This configuration makes it possible to reduce the machining time.

In the above control method of the machine tool, the machining path setting step, when there are first and second machining areas residing side by side along the feed direction of the cutting tool on an identical machining plane, may set the machining paths so as to perform the cutting process on the first machining area and the second machining area by a single feed stroke of the cutting tool. This configuration makes it possible to reduce the machining time.

The above control method of the machine tool may further include a feed rate setting step of, when the cutting process is performed on the first machining area and the second machining area by a single stroke of the cutting tool, setting the feed rate of the cutting tool to be moved between the machining path of the first machining area and the machining path of the second machining area, to a rapid traverse rate. This configuration makes it possible to reduce the machining time.

In the above control method of the machine tool, the differential shape acquisition step may shift the target shape relative to the pre-machining shape so as to minimize the volume of the differential shape. This configuration makes it possible to reduce the machining time.

The present invention is not particularly limited to the embodiments described above, and various modifications are possible without departing from the essence and gist of the present invention.

What is claimed is:

1. A machine tool for performing a cutting process on a workpiece with a cutting tool, the machine tool comprising:
   a measurement unit configured to scan an upper surface of a pre-machining workpiece to measure a height of the upper surface of the pre-machining workpiece at measurement points with respect to a reference plane located below an upper surface of a post-machining workpiece;
   a pre-machining shape acquisition unit configured to acquire, as a pre-machining shape, a shape of the upper surface of the pre-machining workpiece, based on information on the height of the upper surface of the pre-machining workpiece, with respect to the reference plane, at each of the measurement points measured by the measurement unit;
   a target shape acquisition unit configured to acquire, as a reference surface, a target shape of the upper surface of the post-machining workpiece;
   a differential shape acquisition unit configured to acquire a differential shape between the pre-machining shape and the target shape by comparing, with respect to the reference plane, the reference surface of the post-machining workpiece and the shape of the upper surface of the pre-machining workpiece; and
   a machining path setting unit configured to set machining paths so as to perform the cutting process on only the differential shape.

2. The machine tool according to claim 1, further comprising:
   a machining plane setting unit configured to set one or more machining planes parallel to the target shape; and
   a machining area setting unit configured to define a portion where each machining plane intersects the differential shape, as a machining area,
   wherein the machining path setting unit is further configured to set the machining paths in only the machining area on each of the machining planes.

3. The machine tool according to claim 2, wherein the machining path setting unit is further configured to, when there are first and second machining areas on one machining plane of the machining planes, set the machining paths so as to complete the cutting process on the first machining area first and thereafter start the cutting process on the second machining area.

4. The machine tool according to claim 2, wherein the machining path setting unit is further configured to, when there are first and second machining areas residing side by side along a feed direction of the cutting tool on one machining plane of the machining planes, set the machining paths so as to perform the cutting process on the first machining area and the second machining area by a single feed stroke of the cutting tool.

5. The machine tool according to claim 4, further comprising a feed rate setting unit configured to, when the cutting process is performed on the first machining area and the second machining area by a single stroke of the cutting tool, set a feed rate of the cutting tool to be moved between the machining path of the first machining area and the machining path of the second machining area, to a rapid traverse rate.

6. The machine tool according to claim 1, wherein the differential shape acquisition unit is further configured to shift the target shape relative to the pre-machining shape with respect to the reference plane so as to minimize a volume of the differential shape.

7. The machine tool according to claim 1, further comprising a processing machine configured to perform the cutting process on the workpiece based on instructions for performing the cutting process with a machining accuracy of 100 nm or less.

8. The machine tool according to claim 1, wherein, after the differential shape acquisition unit shifts the target shape, the target shape is completely devoid of intersecting with the pre-machining shape.

9. The machine tool according to claim 1, wherein the differential shape acquisition unit is configured to shift the target shape to an area outside of an intersection of the target shape with the pre-machining shape, the differential shape acquisition unit further being configured to acquire a differential shape between the pre-machining shape and the target shape after the target shape is shifted.

10. A control method of a machine tool for performing a cutting process on a workpiece with a cutting tool, the control method comprising:
    scanning an upper surface of a pre-machining workpiece to measure a height of the upper surface of the pre-machining workpiece at measurement points with respect to a reference plane located below an upper surface of a post-machining workpiece;
    acquiring, as a pre-machining shape, a shape of the upper surface of the pre-machining workpiece, based on information on the height of the upper surface of the pre-machining workpiece, with respect to the reference plane, at each of the measurement points;
    acquiring, as a reference surface, a target shape of the upper surface of the post-machining workpiece;
    acquiring a differential shape between the pre-machining shape and the target shape by comparing, with respect to the reference plane, the reference surface of the post-machining workpiece and the shape of the upper surface of the pre-machining workpiece; and
    setting machining paths so as to perform the cutting process on only the differential shape.

11. The control method of the machine tool according to claim 10, further comprising:
    setting one or more machining planes parallel to the target shape; and
    defining a portion where each machining plane intersects the differential shape, as a machining area,
    wherein the setting one or more machining planes sets the machining paths in only the machining area on each of the machining planes.

12. The control method of the machine tool according to claim 11, wherein the setting one or more machining planes, when there are first and second machining areas on one machining plane of the machining planes, sets the machining paths so as to complete the cutting process on the first machining area first and thereafter start the cutting process on the second machining area.

13. The control method of the machine tool according to claim 11, wherein the setting one or more machining planes, when there are first and second machining areas residing side by side along a feed direction of the cutting tool on one machining plane of the machining planes, sets the machining paths so as to perform the cutting process on the first machining area and the second machining area by a single feed stroke of the cutting tool.

14. The control method of the machine tool according to claim 13, further comprising, when the cutting process is performed on the first machining area and the second machining area by a single stroke of the cutting tool, setting a feed rate of the cutting tool to be moved between the machining path of the first machining area and the machining path of the second machining area, to a rapid traverse rate.

15. The control method of the machine tool according to claim 10, wherein the acquiring the differential shape shifts the target shape relative to the pre-machining shape with respect to the reference plane so as to minimize a volume of the differential shape.

16. The control method of the machine tool according to claim 10, wherein shifting of the target shape is in a direction of the height of the workpiece that the upper surface of the workpiece is scanned.

17. The control method of the machine tool according to claim 10, wherein, after shifting of the target shape, the target shape is completely devoid of intersecting with the pre-machining shape.

18. The control method of the machine tool according to claim 10, wherein the acquiring of the differential shape includes:
    shifting the target shape, with respect to the reference plane, to an area outside of an intersection of the target shape with the pre-machining shape; and
    acquiring a differential shape between the pre-machining shape and the target shape after the shifting of the target shape.

\* \* \* \* \*